3,162,679
PRODUCTION OF A TETRAHYDROPHTHALIC ACID AND SALTS THEREOF

Paul N. Rylander, Newark, and Nicholas F. Rakonza, Carteret, N.J., assignors to Engelhard Industries, Inc., Newark, N.J., a corporation of Delaware
No Drawing. Filed Dec. 28, 1962, Ser. No. 247,884
12 Claims. (Cl. 260—514)

This invention relates to the production of a tetrahydrophthalic acid and salts of such acid, and more especially to a process for the production of tetrahydroterephthalic acid, tetrahydroisophthalic acid, and salts thereof.

Tetrahydroisophthalic and tetrahydroterephthalic acids have been obtained heretofore by the reduction of the m- and p-phthalic acids respectively in the presence of sodium amalgam. However, such reduction process is unsatisfactory for the reasons the sodium amalgam is difficult to handle and the process is expensive and not readily adaptable to large scale production. While catalytic hydrogenation is a far more convenient method of reduction, in the catalytic nuclear hydrogenation of aromatics, the formation of the hexahydro-compounds is favored over the formation of non-resonating unsaturated systems. Indeed it is often assumed that the reduction of the aromatic ring proceeds directly to complete saturation. Further the hydrogenation of fused benzene rings, as contrasted with the hydrogenation of benzene, shows that the hydrogenation of fused rings such as naphthalene and anthracene, unlike benzene, proceeds in stages. However, even where it has been hypothesized that the hydrogenation of aromatic rings proceeds in stages, it has been indicated that the chances of isolating the intermediate partially hydrogenated compounds are remote since they are reduced so fast.

Catalytic hydrogenation of terephthalic acid and isophthalic acid to hexahydro-derivatives have been reported. For example, a nickel-cobalt-copper catalyst and various platinum catalysts have been used and the hexahydro-derivatives have been obtained. Ruthenium has also been used heretofore to catalyze the hydrogenation of di-alkali salts of phthalic acids to the corresponding hexahydro-compounds.

It has now been found that the tetrahydro-derivatives of isophthalic and terephthalic acids can be produced by catalytic hydrogenation. In accordance with the present invention, isophthalic acid or terephthalic acid, which has been partially or completely converted to the mono-alkali salt of the acid by reaction with an alkali in the molar ratio range of about 0.005–1:1 of alkali to acid respectively, preferably about 0.01–1:1 of alkali to the acid, is hydrogenated in the presence of a ruthenium catalyst. This hydrogenating is continued in the presence of the ruthenium until the corresponding tetrahydro acid and/or its salts is formed, which is indicated by a sharp reduction in the hydrogenation rate. The hydrogenating is carried out by contacting a dispersion of the phthalic acid and/or its mono-alkali salt with hydrogen in the presence of the catalyst.

The materially increased hydrogenation rate provided by this invention, shown in comparative test data in Examples I–III herein, was surprising and unexpected, and is of considerable importance from a commercial standpoint.

The quantity of alkali utilized should not exceed much above 1 mole of alkali per mole of the substrate for the reason that with larger quantities of alkali the hydrogenation rate was considerably lowered, and with amounts much below .005 mole per mole of the phthalic acid, the hydrogenation rate was also lower than that desired. The term alkali is used herein to mean an alkali metal hydroxide, e.g. NaOH, KOH; or ammonium hydroxide. The ammonium hydroxide is preferably added as such although it can also be formed in situ by dissolving ammonia in the water of an aqueous dispersing medium.

The ruthenium content of the catalyst of the invention can be, for example, elemental ruthenium or oxides thereof, such as the sesquioxide, and dioxide, or a suitable salt of ruthenium. Forms of ruthenium partly or completely reduced from ruthenium compounds are preferred due to the unusual efficacy which they possess as promoting catalysts in the hydrogenation reactions of the present invention. Exemplary of the supports are carbon, alumina, barium sulfate, calcium sulfate, asbestos and kieselguhr. The supports can be in the form of granules, powder or pellets. The ruthenium metal content of the supported ruthenium catalyst is preferably from about 0.1–10 percent by weight, more preferably from about 1–5 percent by weight. The amount of catalyst utilzed will preferably range from about 0.05–10 percent, more preferably from about 1–5 percent by weight based on the weight of the particular phthalic acid being hydrogenated.

The products of this invention are tetrahydroterephthalic acid or tetrahydroisophthalic acid, or their salts such as the mono-alkali metal or mono-ammonium salts thereof. When the mono-salt is the desired product, the alkali is preferably added to the acid in mole per mole quantity. The salts can be chemically converted, such as by acidification, to the corresponding acid.

The tetrahydro acids of this invention have utility for the production of polymers such as the synthesis of polyesters, for instance polyesters of tetrahydroterephthalic acid or tetrahydroisophthalic acid and glycols, for instance ethylene glycol; and for the production of polyamides such as by the condensation reaction of the tetrahydro acid and a diamine, for instance hexamethylenediamine.

Reaction temperatures for the hydrogenation reactions of this invention may range from about 50° C.–250° C., preferably from about 80° C.–150° C. Generally there is an increase in the rate of reaction with increase in temperature; however as the temperature rises it is more difficult to control the reaction. Also, to insure a long catalyst life the lower temperatures within the preferred range are preferable. The hydrogen pressure employed in the reaction may range from about 300–15,000 p.s.i.g., preferably from about 500–3,000 p.s.i.g.

Prior to hydrogenation, the dispersion containing the added alkali should be acid and preferably its pH is less than 6.

The process can either be carried out batchwise or continuous, with continuous operation preferred from a commercial standpoint. In a batch operation, it is preferable to provide constant agitation of the reaction mixture to maintain good contacting of the reactants with the catalyst.

The acids can be recovered by separating the catalyst from the reaction product mass, for instance by filtration, and adding at least 1 mol of acid per mol of alkali present, and thereafter recovering the precipitated acid by filtration. The salts can be recovered from solution by evaporating such solutions to dryness. The recovered salts can then be purified by recrystallization.

For the production of the tetrahydro-derivatives, when two mols of $H_2$ are absorbed, the reaction is stopped. The hydrogenation is easily limited to the uptake of only two mols of $H_2$ in accordance with the present invention since there is a sharp decline in the reaction rate amounting to a virtual cessation of the reaction after 2 mols of $H_2$ have been absorbed. This sharp decline in the rate of hydrogenation after reaction of two moles is shown in Example I hereafter set forth, wherein two moles of hydrogen were absorbed in about 110 minutes followed by a sharp decline in the absorption as shown by no pressure change caused by absorption of hydrogen after 110 additional minutes of hydrogenation.

The invention is further illustrated by reference to the following examples:

EXAMPLE I

Tests were conducted on the hydrogenation of terephthalic acid with ruthenium deposited on carbon as catalyst. Hydrogen gas was fed at a pressure of 2250 p.s.i.g. to a reactor equipped with an agitator and containing 30 g. of terephthalic acid, varying quantities of sodium hydroxide and water, and 1.5 g. of ruthenium on carbon in four of the test runs; 70 ml. hexahydrobenzoic acid instead of the sodium hydroxide and 30 ml. water in one run with the same amounts of terephthalic acid and ruthenium on carbon; and 70 ml. hexahydrobenzoic acid instead of the sodium hydroxide but without water in another run and the same amounts of terephthalic acid and ruthenium on carbon catalyst in this last-mentioned run as in previous test runs. The reactor was heated to 140° C. and maintained at about 140° C. for each run.

Table I

| Run | Additive | Moles of NaOH:Terephthalic Acid | Change of $H_2$ Pressure (p.s.i.g.) in Period (Minutes) | | |
|---|---|---|---|---|---|
| | | | 0-8 | 0-20 | 0-96 |
| 1 | 70 ml. Hexahydrobenzoic acid. | | 10 | 10 | 10 |
| 2 | _____do_____ | | 25 | 35 | 50 |
| 3 | 90 ml. 2 N NaOH, 10 ml. $H_2O$. | 1:1 | 30 | 65 | 230 |
| 4 | _____do_____ | 1:1 | 30 | 65 | 240 |
| 5 | 56 ml. 6.5 N NaOH, 44 ml. $H_2O$. | 2:1 | 25 | 30 | 30 |
| 6 | 15 ml. 0.1 N NaOH, 85 ml. $H_2O$. | .01:1 | 70 | 115 | 170 |

From the data of Table I it is readily seen that when the alkali was added in the molar ratio range of .01–1:1 of NaOH to terephthalic acid respectively, the hydrogenation rate was materially improved as evidenced by the change in $H_2$ pressure is compared with either no addition of the alkali or the addition of alkali materially in excess of the upper limit of alkali to acid of this invention. When the alkali was added in the molar ratio of 2:1 of NaOH to terephthalic acid respectively, the hydrogenation rate was materially lower after 8 minutes than when the alkali was added in amount within the mole ratio range of this invention. Furthermore, the catalyst appeared to be poisoned after 8 minutes.

EXAMPLE II 30 g. of terephthalic acid, 10 ml. of water, 90 ml. of 2 N sodium hydroxide and 1.5 g. of 5 percent Ru on carbon were charged to a reactor equipped with an agitator and heated to 140° C. The reactor was immersed in a constant temperature bath. The reactor was pressured with hydrogen to 2250 p.s.i.g., the agitator started, and the reaction effected until hydrogen absorption or reaction showed an abrupt decline and virtual cessation. A gauge on a hydrogen reservoir feeding hydrogen into the reactor registered the pressure drop corresponding to the hydrogen uptake of the reaction. Periodic readings of the pressure drop were made and recorded. The reactor was then depressed, cooled to 80° C. and the product filtered. The filtrate was acidified by addition of 90 ml. of 2 N HCl, and the resulting precipitate filtered off. After drying, the precipitate, weighing 3 g., melted at 290° C. and was shown to be $\Delta^1$-tetrahydroterephthalic acid with a trace of trans-$\Delta^2$-tetrahydroterephthalic acid.

Acetone was added to the filtrate until no further precipitate formed. This material was filtered and dried. The dried precipitate, which weighed 22 g., had a melting point of 161° C., and was identified as cis-$\Delta^2$-tetrahydroterephthalic acid.

The total yield of these tetrahydroterephthalic acids, identified by the amount of hydrogen absorbed or reacted, the neutral equivalent, melting point and infra-red spectrogram, was 82 percent.

The following changes in $H_2$ pressure were recorded during the hydrogenation.

Table II

| Time in minutes: | $H_2$ pressure (p.s.i.g.) |
|---|---|
| 3 | 10 |
| 5 | 20 |
| 7 | 30 |
| 10 | 50 |
| 15 | 60 |
| 30 | 80 |
| 60 | 170 |
| 90 | 250 |
| 100 | 280 |
| 105 | 290 |
| 110 | 300 |

The reaction was continued for 75 additional minutes. No pressure change of $H_2$ was observed after 110 minutes. A pressure change of 300 p.s.i. corresponds to the reaction of 2 moles of $H_2$ with the acid.

EXAMPLE III

The procedure of Example II is repeated except that 30 g. isophthalic acid was used instead of the terephthalic acid. After the uptake of 2 moles of $H_2$ which was indicative of the formation of the tetrahydro compound, the reaction stopped spontaneously.

The following changes in $H_2$ pressure were observed.

Table III

| Time in minutes: | $H_2$ (p.s.i.g.) |
|---|---|
| 1 | 30 |
| 2 | 50 |
| 3 | 60 |
| 4 | 70 |
| 5 | 70 |
| 10 | 100 |
| 15 | 130 |
| 30 | 180 |
| 60 | 250 |
| 75 | 270 |
| 90 | 290 |
| 105 | 310 |
| 120 | 310 |

No pressure change was observed after 105 minutes by absorption of hydrogen as is indicated in Table III. The pressure change of 300 p.s.i.g. corresponds to an uptake of 2 moles of hydrogen.

It will be obvious to those skilled in the art that many modifications may be made within the scope of the present invention without departing from the spirit thereof and this invention includes all such modifications.

What is claimed is:

1. A process for the production of a tetrahydro compound of the group consisting of tetrahydroterephthalic acid, tetrahydroisophthalic acid, and alkali salts thereof, which comprises hydrogenating a phthalic acid of the group consisting of terephthalic acid and isophthalic acid which has been at least partially converted to the mono-alkali salt of the acid by reaction with an alkali in the molar ratio range of about 0.005–1:1 of alkali to acid respectively, in the presence of a ruthenium catalyst at a temperature in the range of from about 50° C.–250° C. and a pressure in the range of from about 300–15,000 p.s.i.g., and continuing the hydrogenating until the tetrahydro compound is formed as indicated by a cessation of the hydrogenation reaction.

2. The process of claim 1 wherein the alkali is an alkali metal hydroxide.

3. The process of claim 1 wherein the alkali is ammonium hydroxide.

4. A process for the production of a tetrahydro compound of the group consisting of tetrahydroterephthalic acid, tetrahydroisophthalic acid, and alkali salts thereof, which comprises adding an alkali to a dispersion of a phthalic acid of the group consisting of terephthalic acid and isophthalic acid, the alkali being added in amount with the molar ratio range of about .005–1:1 of alkali to acid respectively, contacting the resulting admixture in the presence of hydrogen with a ruthenium catalyst at a temperature in the range from about 50° C.–250° C. and a pressure in the range from about 300–15,000 p.s.i.g., and continuing the catalytic contacting in the presence of the hydrogen until the tetrahydro compound is formed as indicated by a cessation of the hydrogenation reaction.

5. A process for the preparation of tetrahydroterephthalic acid, which comprises adding an alkali to a dispersion of terephthalic acid, the alkali being added in amount within the molar ratio range of about .005–1:1 of alkali to acid respectively, contacting the resulting admixture in the presence of hydrogen with a ruthenium catalyst at a temperature in the range of from about 50° C.–250° C. and a pressure in the range from about 300–15,000 p.s.i.g., continuing the catalytic contacting in the presence of the hydrogen until two moles of hydrogen have reacted with the terephthalic acid to form the tetrahydroterephthalic acid as indicated by a cessation of the hydrogenation reaction, chemically converting the resulting tetrahydroterephthalic acid alkali salt in the reaction mixture to the corresponding acid, and recovering tetrahydroterephthalic acid from the reaction mixture.

6. A process for the preparation of tetrahydroisophthalic acid, which comprises adding an alkali to a dispersion of isophthalic acid, the alkali being added to the dispersion in amount with the molar ratio range of about .005–1:1 of alkali to acid respectively, contacting the resulting admixture in the presence of hydrogen with a ruthenium catalyst at a temperature in the range from about 50° C–250° C. and a pressure in the range from about 300–15,000 p.s.i.g., continuing the catalytic contacting in the presence of the hydrogen until two moles of hydrogen have reacted with the isophthalic acid to form the tetrahydroisophthalic acid as indicated by a cessation of the hydrogenation reaction, chemically converting the resulting tetrahydroisophthalic acid alkali salt in the reaction mixture to the corresponding acid, and recovering tetrahydroisophthalic acid from the reaction mixture.

7. The process of claim 5 wherein the alkali is an alkali metal hydroxide.

8. The process of claim 5 wherein the alkali is ammonium hydroxide.

9. The process of claim 6 wherein the alkali is an alkali metal hydroxide.

10. The process of claim 6 wherein the alkali is ammonium hydroxide.

11. A process for the preparation of a mono-alkali salt of tetrahydroterephthalic acid, which comprises adding an alkali to an aqueous dispersion of terephthalic acid in amount of one mole of the alkali per mole of the acid, contacing the resulting admixture in the presence of hydrogen with a ruthenium catalyst at a temperature in the range from about 80° C.–150° C. and a pressure in the range from about 500–3,000 p.s.i.g., and continuing the catalytic contacting in the presence of the hydrogen until two moles of hydrogen have reacted to form the tetrahydroterephthalic acid mono-alkali salt as indicated by a cessation of the hydrogenation reaction.

12. A process for the preparation of a mono-alkali salt of tetrahydroisophthalic acid, which comprises adding an alkali to an aqueous dispersion of isophthalic acid in amount of one mole of the alkali per mole of the acid, contacting the resulting admixture in the presence of hydrogen with a ruthenium catalyst at a temperature in the range from about 80° C.–150° C. and a pressure in the range from about 500–3,000 p.s.i.g., and continuing the catalytic contacting in the presence of the hydrogen until two moles of hydrogen have reacted to form the tetrahydroisophthalic acid mono-alkali salt as indicated by a cessation of the hydrogenation reaction.

References Cited in the file of this patent

UNITED STATES PATENTS

| 2,828,335 | Ferstandig et al. | Mar. 5, 1958 |
| 2,888,484 | Dehm et al. | May 26, 1959 |

OTHER REFERENCES

Houben: "Die Methoden der Organ. Chem.," vol. 2, 3rd edition (1925), pp. 336–338.

UNITED STATES PATENT OFFICE
CERTIFICATE OF CORRECTION

Patent No. 3,162,679                              December 22, 1964

Paul N. Rylander et al.

It is hereby certified that error appears in the above numbered patent requiring correction and that the said Letters Patent should read as corrected below.

In the grant, lines 1 and 2, for "Nicholas E. Rakonza" read -- Nicholas F. Rakoncza --; in the heading to the printed specification, line 4, for "Nicholas F. Rakonza" read -- Nicholas F. Rakoncza --; column 1, line 58, after "rate" insert a period --; column 3, line 46, for "is" read -- as --; column 5, lines 13 and 40, for "with", each occurrence, read -- within --; line 44, after "C", first occurrence, insert a period --; column 6, line 19, for "contacing" read -- contacting --.

Signed and sealed this 20th day of July 1965.

(SEAL)
Attest:

ERNEST W. SWIDER                               EDWARD J. BRENNER
Attesting Officer                                Commissioner of Patents